July 21, 1925.
E. H. SIPES
1,546,513
RESILIENT WHEEL
Filed June 10, 1924
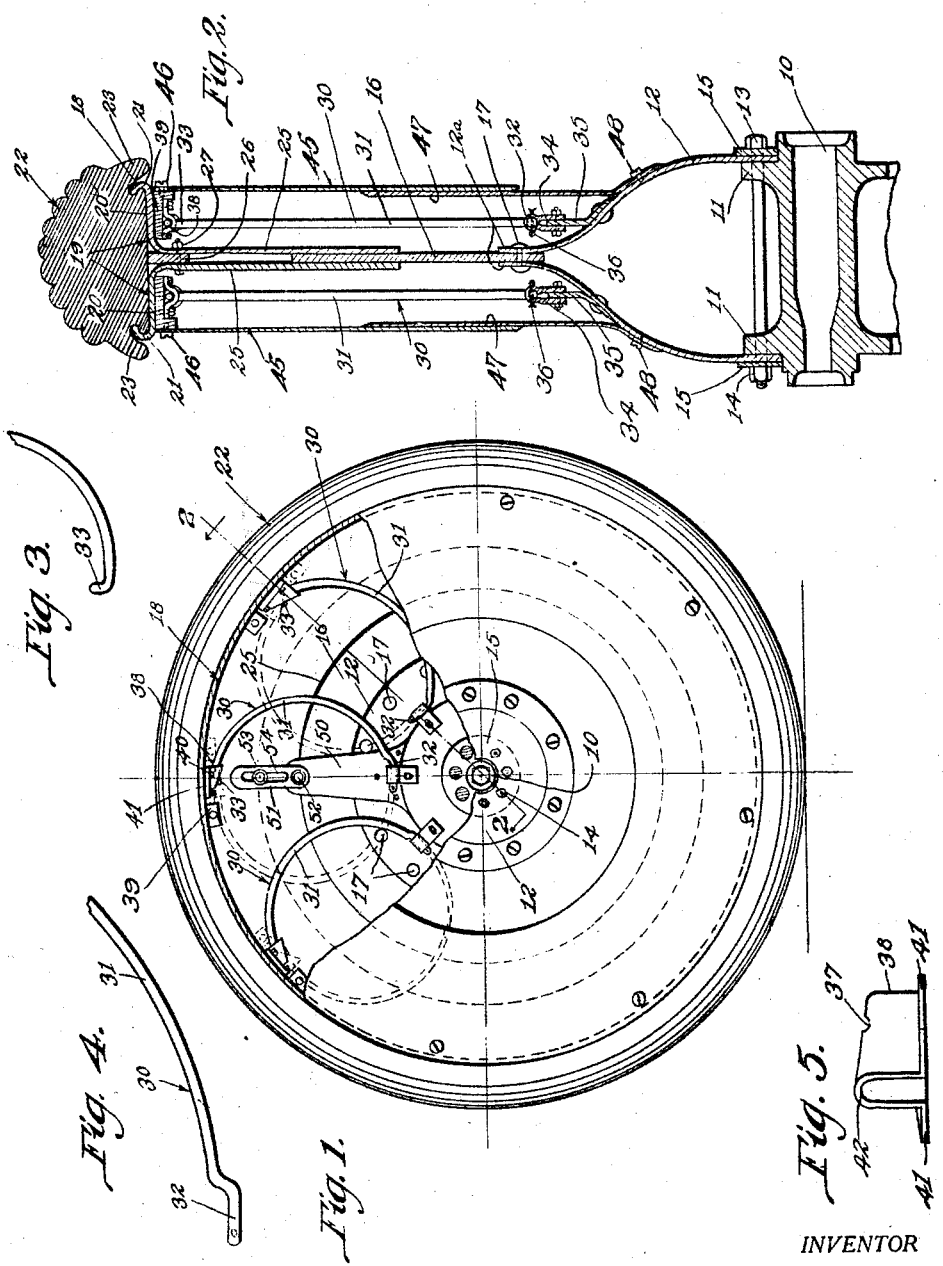
INVENTOR
E. H. Sipes.
BY
ATTORNEYS Patented July 21, 1925.

1,546,513

UNITED STATES PATENT OFFICE.

EARL H. SIPES, OF TRIPP, SOUTH DAKOTA.

RESILIENT WHEEL.

Application filed June 10, 1924. Serial No. 719,178.

*To all whom it may concern:*

Be it known that I, EARL H. SIPES, a citizen of the United States, and a resident of Tripp, in the county of Hutchinson and State of South Dakota, have invented certain new and useful Improvements in Resilient Wheels, of which the following is a specification.

This invention relates to an improvement in resilient wheels, and aims to provide a wheel structure having all of the lateral rigidity and all of the durable qualities of the ordinary rigid types of wheels while providing such a cushioning action as to enable a solid rubber type of tire to be used and yet the easy riding qualities of a pneumatic tire to be obtained.

A further object is to provide a resilient wheel of this character and having these advantages and wherein the load is distributed evenly throughout all of the springs employed in the wheel.

A still further object is to provide a spring wheel having these capacities and which is capable of use as a drive wheel.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a view of one embodiment of the invention, the view being taken in side elevation with parts broken away for the sake of illustration;

Figure 2 is a view in transverse cross section taken on line 2—2 of Figure 1;

Figure 3 is a detail view of one end of one of the springs employed;

Figure 4 is a similar view of the opposite end of such springs; and

Figure 5 is a detail view of the clip for the outer end of each spring.

Referring to the drawings, the numeral 10 designates a hub having spaced flanges 11 to which the inner peripheral edges of annular plates 12 are secured by means of bolts 13 and nuts 14, flat springs 15 being interposed between the heads of the bolts 13 and the adjacent plate 12 and between the nuts 14 and the plate 12 adjacent thereto. In cross section the plates 12 curve inwardly toward their outer peripheries as shown in Figure 2. The outer marginal portions 12ª of the plates 12 are disposed in slightly spaced parallel relation and between such portions 12ª the inner edge of an annular guide plate 16 is positioned, the inner edge of the plate 16 being secured to the portions 12ª as by means of rivets 17.

A rim designated generally at 18 is provided and preferably is made up of two similar parts, designated at 19, and each having a base section 20 and a tire engaging flange 21. A solid tire designated generally at 22 and which may be of the type and form shown in the drawings is held on the base sections 20 by the flanges 21. As shown in Figure 2 of the drawing the tire 22 may have portions 23 overlying the flanges 21 in spaced relation thereto. It is to be understood however that any suitable type of tire may be used. The parts 19 of the rim carry spaced annular guide plates 25 which may be integrally formed with the base sections 20 of the parts of the rim. A spacing ring 26 is interposed between the plates 25 and the plates 25 and ring 26 as well as the parts 19 of the rim 18 are held in assembly by bolts and nuts 27. As shown in Figure 2, the plate 16 is slidably fitted in between the plates 25 to give the wheel lateral rigidity while allowing the same the freedom of motion in the plane of the wheel essential to its cushioning properties as will hereinafter appear. It is to be noted that the guide plate 16 is disposed centrally in the plane of the wheel and that the plates 12 and the parts of the rim are located symmetrically with respect to the plane of the wheel. The plates 12, 16 and 25 make up the body of the wheel.

On each side of the body of the wheel, a series of springs 30 is provided. The springs 30 are of identical construction but the springs of the series on one side of the wheel are oppositely arranged with respect to the springs of the series on the other side of the wheel. It may also be found desirable to stagger the springs of one series with respect to the springs of the other series.

Each spring 30 is constructed of a rod of resilient metal and comprises a curved body portion 31, which is preferably of semi-circular form, an offset and straightened inner end 32, and an angular and straightened outer end 33. Each spring 30 has its inner end 32 rotatably mounted in a bearing bracket 34 provided therefor.

The bearing brackets 34 are fixedly supported on carrier strips 35 riveted or bolted to the plates 12. Cotter pins 36 hold the ends 32 from endwise displacement from their bearings. The outer ends 33 of the springs 30 are received in openings 37 provided in clips 38, the latter being secured to L-shaped irons 39 applied to the inner faces of the base sections 20 of the parts 19 of the rim 18. Stud bolts 40 engage with the flanges 41 of the clips 38 and serve to secure the clips 38 to the irons 39 and the irons 39 to the parts 19 of the rim. The clips 38 have body portions 42 which enlarge toward one end to provide the clearance necessary for free flexion of the springs 30 within proper limits. These body portions 42 also serve as stops to prevent excessive bending of the outer ends of the springs.

Annular cover plates 45 are carried by the rim (the cover plates 45 being fastened by screws 46 to the irons 39) and slidably overlap similar cover plates 47 fastened by screws 48 to the plates 12.

With this arrangement the load is equally distributed on all of the springs 30 and sudden shocks and strains are likewise distributed and are absorbed by all of the springs. While high cushioning properties are developed in the wheel, excessive strains or excessive flexion which are liable to cause crystallization or to otherwise injure the springs is prevented. Moreover the wheel is rigid with respect to transverse strains and is so well organized as to be well adapted for use as a drive wheel.

When used as a drive wheel, traction locks may be provided for preventing excessive strains in the springs should the power be applied to the wheel too suddenly. Any number of traction locks may be embodied in each wheel and each such lock preferably includes a radial arm 50 secured to one of the plates 12, a link 51 having one end pivotally connected, as at 52, to the outer end of the arm 50, and a pin 53 fixed to and projecting laterally from one of the plates 25, the pin 53 operating in a slot 54 formed in the link 51. With this arrangement the pin 53 has ample play in the slot 54 to allow the springs 30 to flex to the maximum but the pin 53 engages the wall at the outer end of the slot 54 to prevent excessive flexion.

By rotatably mounting the inner ends of the springs on the hub so that the springs may rock in a plane at right angles to the plane of the wheel, the strains of maintaining the lateral rigidity of the wheel must necessarily be taken by the guide plates and cannot be set up in the springs even though there be slight play between the guide plates. Moreover the clips 38 and bearing brackets 34 may be out of line or displaced transversely without setting up any strains in the springs.

I claim:

1. In a resilient wheel, a hub, a rim, co-operating guide means carried by the hub and the rim for preventing lateral displacement of the rim relative to the hub while permitting relative circumferential and radial movement with respect thereto, a plurality of springs connecting the rim and felly, and means for limiting the circumferential movement of the rim relative to the hub and comprising a link pivotally connected to the hub and having a pin and slot connection with the rim.

2. In a resilient wheel, a hub, a rim, co-operating guide means carried by the hub and the rim for preventing lateral displacement of the rim relative to the hub while permitting relative circumferential and radial movement with respect thereto, and springs between the hub and the rim, means for connecting the outer end of each spring to the rim, and means for connecting the inner end of each spring to the hub to permit of free rocking movement of the springs relative to the hub in a plane at right angles to the plane of the wheel.

3. In a resilient wheel, a hub, a rim, a plurality of springs between the hub and the rim, and a clip for securing the outer end of each spring to the rim, each clip having a tapered body portion permitting free movement of its spring within limits but providing a stop to prevent excessive flexion of its spring.

4. In a resilient wheel, a hub, a rim, a pair of annular plates secured to the hub, said plates curving or converging toward their outer edges, a guide plate secured to the outer edges of said plates, a pair of guide plates carried by the rim and slidably embracing the first mentioned guide plate, springs between the rim and the hub on each side of the guide plates, and overlapping cover plates carried by the hub and rim.

5. In a resilient wheel, a hub, a guide plate disposed in the plane of the wheel and carried by the hub, a rim made up of two parts, each part comprising a base section and a tire retaining flange, a pair of guide plates integrally formed with the parts of the rim and slidably embracing the first mentioned guide plate, a spacing element between the parts of the rim, fastening devices for holding the parts of the rim and the spacing element in assembly, and springs between the rim and the hub on each side of said plates.

EARL H. SIPES.